(12) United States Patent
Isami et al.

(10) Patent No.: US 11,760,209 B2
(45) Date of Patent: Sep. 19, 2023

(54) ELECTRIC VEHICLE

(71) Applicant: TOYOTA JIDOSHA KABUSHIKI KAISHA, Toyota (JP)

(72) Inventors: Yoichiro Isami, Mishima (JP); Yoshio Itou, Susono (JP); Hiroyuki Amano, Susono (JP); Tatsuya Imamura, Okazaki (JP); Akiko Nishimine, Susono (JP); Hiroaki Ebuchi, Hadano (JP); Hiroaki Kodera, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 81 days.

(21) Appl. No.: 17/379,192

(22) Filed: Jul. 19, 2021

(65) Prior Publication Data

US 2022/0041067 A1 Feb. 10, 2022

(30) Foreign Application Priority Data

Aug. 7, 2020 (JP) .................................. 2020-135077

(51) Int. Cl.
*B60L 15/20* (2006.01)
*B60K 26/02* (2006.01)
(Continued)

(52) U.S. Cl.
CPC .............. *B60L 15/02* (2013.01); *B60K 26/02* (2013.01); *B60W 30/1884* (2013.01);
(Continued)

(58) Field of Classification Search
CPC .... B60L 15/20; B60K 26/02; B60W 30/1884; B60W 50/14; B60W 2555/00; B60W 2552/15; B60W 2554/80; H02P 27/08
See application file for complete search history.

(56) References Cited

U.S. PATENT DOCUMENTS

| 6,565,476 B1 * | 5/2003 | Bae ..................... F16D 25/0638 |
| | | 475/320 |
| 2012/0083958 A1 * | 4/2012 | Ballard ................. B60W 50/10 |
| | | 701/56 |

(Continued)

FOREIGN PATENT DOCUMENTS

| CN | 109177742 A | * | 1/2019 | .............. B60L 15/20 |
| CN | 109177742 B | | 6/2020 | |

(Continued)

OTHER PUBLICATIONS

Bao et al., English translation of CN109177742A, 2019, Espace.net (Year: 2019).*

*Primary Examiner* — Yazan A Soofi
*Assistant Examiner* — Naeem Taslim Alam
(74) *Attorney, Agent, or Firm* — Sughrue Mion, PLLC

(57) ABSTRACT

The controller of the electric vehicle is configured to control the torque of the electric motor using the MT vehicle model based on the operation amount of the accelerator pedal, the operation amount of the pseudo-clutch pedal, and the shift position of the pseudo-shifter. Further, the controller is configured to execute the stall production process for changing the engine output torque used for calculation of the driving wheel torque to zero when the calculated virtual engine speed using the MT vehicle model becomes lower than the prescribed stall engine speed.

5 Claims, 11 Drawing Sheets

(51) Int. Cl.
*B60W 30/188* (2012.01)
*B60W 50/14* (2020.01)
*B60L 15/02* (2006.01)
*H02P 27/08* (2006.01)

(52) U.S. Cl.
CPC ......... *B60W 50/14* (2013.01); *B60W 2552/15* (2020.02); *B60W 2554/80* (2020.02); *B60W 2555/00* (2020.02); *H02P 27/08* (2013.01)

(56) References Cited

U.S. PATENT DOCUMENTS

| | | | |
|---|---|---|---|
| 2018/0001883 A1* | 1/2018 | Flandrinck | F16K 31/1223 |
| 2018/0086327 A1* | 3/2018 | Maguire | B60W 10/10 |
| 2018/0281619 A1 | 10/2018 | Suzuki et al. | |
| 2021/0402877 A1* | 12/2021 | Velazquez Alcantar | B60W 30/18181 |

FOREIGN PATENT DOCUMENTS

| | | |
|---|---|---|
| EP | 3401201 A1 | 11/2018 |
| JP | 2010-252526 A | 11/2010 |
| JP | 2018-166386 A | 10/2018 |
| JP | 2018-191366 A | 11/2018 |
| WO | 2020/025860 A1 | 2/2020 |

\* cited by examiner

ELECTRIC VEHICLE

CROSS-REFERENCE TO RELATED APPLICATION

The present application claims priority under 35 U.S.C. § 119 to Japanese Patent Application No. 2020-135077, filed Aug. 7, 2020, the contents of which application are incorporated herein by reference in their entirety.

BACKGROUND

Field

The present disclosure relates to an electric vehicle in which an electric motor is used as a power source for traveling.

Background

Torque characteristics of an electric motor used as a power source for traveling in an electric vehicle (EV: Electric Vehicle) are greatly different from those of an internal combustion engine used as a power source for traveling in conventional vehicles. Due to the differences in the torque characteristics of the power source, conventional internal combustion engine vehicles require a transmission, while EVs generally do not have the transmission. Of course, EVs are not equipped with a manual transmission (MT: Manual Transmission) that switches gear ratios by the driver's manual operation. Therefore, there is a great difference in driving feeling between driving of conventional vehicles with MT (hereinafter referred to as MT vehicles) and driving of EVs.

On the other hand, the electric motor can control the torque relatively easily by controlling the applied voltage and magnetic field. Therefore, in the electrical motor, it is possible to obtain the desired torque characteristics within the operating range of the electric motor by implementing appropriate control. Taking advantage of this feature, a technique to simulate the torque characteristics peculiar to MT vehicles by controlling the torque of EVs has been proposed so far.

JP 2018-166386 discloses a technology to produce a pseudo shift change in a vehicle that transmits torque to the wheels by a drive motor. In this vehicle, torque fluctuation control is performed to decrease the torque of the drive motor by a set variation amount and then increase the torque again in a predetermined time at a predetermined trigger defined by the vehicle speed, accelerator pedal opening degree, accelerator opening speed, or brake depression amount. As a result, the sense of discomfort given to drivers who are accustomed to vehicles having a stepped transmission is suppressed.

SUMMARY

However, in the above technique, it is impossible to determine the timing of the torque fluctuation control simulating the shifting operation voluntarily by the driver's own operation. Particularly for drivers who are accustomed to driving MT vehicles, a pseudo-shifting operation that does not involve the driver's own manual shifting operation may cause discomfort in the driving senses of drivers who seek the pleasure of driving MT.

In view of such circumstances, the inventors of the present application have considered providing a pseudo-shifter and a pseudo-clutch pedal in EVs so that the driving sense of an MT vehicle can be obtained in EVs. Of course, these pseudo-devices are not simply attached to EVs. The inventors of the present application are considering allowing the electric motor to be controlled by the operation of the pseudo-shifter and the pseudo-clutch pedal so that torque characteristic similar to the torque characteristic of the MT vehicle can be obtained.

By the way, the driver of the MT vehicle must successfully cooperate with the accelerator pedal, shifter, and clutch pedal to prevent the engine from stalling. Although this operation is a laborious operation, it is indispensable for the driver who demands the enjoyment of operating the MT vehicle.

In an electric vehicle equipped with a pseudo-shifter and a pseudo-clutch pedal, it is expected that in response to the needs of such drivers, they will be able to experience the pleasure of operating MT vehicles by the pseudo-shifter and the pseudo-clutch pedal. However, such electric vehicles are not equipped with actual engines. Therefore, even if the EV can be operated like an MT vehicle by the operation of the pseudo device, the driving feeling of the engine actually stalls cannot be experienced. This may give a sense of discomfort to the driver who knows the driving sensation of the MT vehicle.

The present invention has been made in view of the above-mentioned problems, and an object thereof is to provide an electric vehicle that allows the driver to experience the driving sensation of an engine stall like a MT vehicle.

In order to solve the above problems, the first disclosure is applied to an electric vehicle using an electric motor as a power source for traveling. The electric vehicle includes an accelerator pedal, a pseudo-clutch pedal, a pseudo-shifter, and a controller configured to control motor torque output by the electric motor. The controller includes, a memory, and a processor. The memory configured to store an MT vehicle model simulating a torque characteristic of a driving wheel torque in an MT vehicle having an internal combustion engine which is controlled torque by operation of a gas pedal, and a manual transmission in which a gear stage is switched by operation of a clutch pedal and a shifter. The processor is configured to execute a process of receiving an operation amount of the accelerator pedal as an input of an operation amount of the gas pedal with respect to the MT vehicle model, a process of receiving an operation amount of the pseudo-clutch pedal as an input of an operation amount of the clutch pedal with respect to the MT vehicle model, a process of receiving a shift position of the pseudo-shifter as an input of a shift position of the shifter with respect to the MT vehicle model, a process of calculating the driving wheel torque determined by the operation amount of the accelerator pedal, the operation amount of the pseudo-clutch pedal, and the shift position of the pseudo-shifter, using the MT vehicle model, and a process of calculating the motor torque for providing the driving wheel torque to driving wheels of the electric vehicle. In the process of calculating the driving wheel torque, the processor is configured to execute a process of calculating an engine speed of the internal combustion engine using the MT vehicle model, a process of calculating an engine output torque of the internal combustion engine determined by the engine speed and the operation amount of the acceleration pedal, using the MT vehicle model, a process of calculating the driving wheel torque determined by the operation amount of the pseudo-clutch pedal, the shift position of the pseudo-shifter, and the engine output torque, using the MT vehicle model, and a stall production process of changing the engine output torque used in the calculation of the driving wheel torque to zero, when the engine speed of the internal combustion engine becomes lower than a predetermined stall engine speed.

The second disclosure has the following features in the first disclosure.

In the stall production process, the processor is configured to execute a process of notifying a driver of execution of the stall production process.

The third disclosure has the following features in the first or second disclosure.

The electric vehicle further includes an external sensor for detecting a situation in which the vehicle is placed. The processor is configured to execute a process of determining whether the vehicle is in a specific situation in which the stall production process should be avoided based on the situation detected by the external sensor, and a process of avoiding execution of the stall production process when the vehicle is in the specific situation in the process of determining.

The fourth disclosure has the following features in the third disclosure.

The external sensor is configured to detect as the situation at least one of an inclination angle of a traveling road, a distance to a trailing vehicle, and a degree of congestion of a road.

The fifth disclose has the following features in the third or fourth disclosure.

The processor is configured to execute a process of notifying a driver that execution of the stall production process is avoided, when the vehicle is in the specific situation in the process of determining.

According to the above configuration, the driver can drive the electric vehicle like an MT vehicle having an internal combustion engine and a manual transmission. The electric vehicle is also controlled to change the engine output torque used for the calculation of the driving wheel torque to zero when the engine speed of the internal combustion engine of the MT vehicle model becomes lower than the predetermined stall rotational speed. This allows the vehicle to stop as if the engine has stalled, so the driver can experience the driving sensation of the engine stall like in a MT vehicle.

According to the second disclosure, when the stall production process is executed, the driver is notified. Thereby, the driver can grasp the factor of the stop of the vehicle.

According to the third or fourth disclosure, the execution of the stall production process is avoided when the vehicle is placed in the specific situation in which the stall production process is to be avoided based on the situation obtained from the external sensor. This makes it possible to enjoy driving in the MT mode while giving priority to safety, security, and smooth traffic flow for the driver.

According to the fifth disclosure, when the stall production process is avoided, the driver is notified. This allows the driver to safely enjoy driving in the MT mode without continuing to have anxiety that may stall.

DETAILED DESCRIPTION

Figure 1:
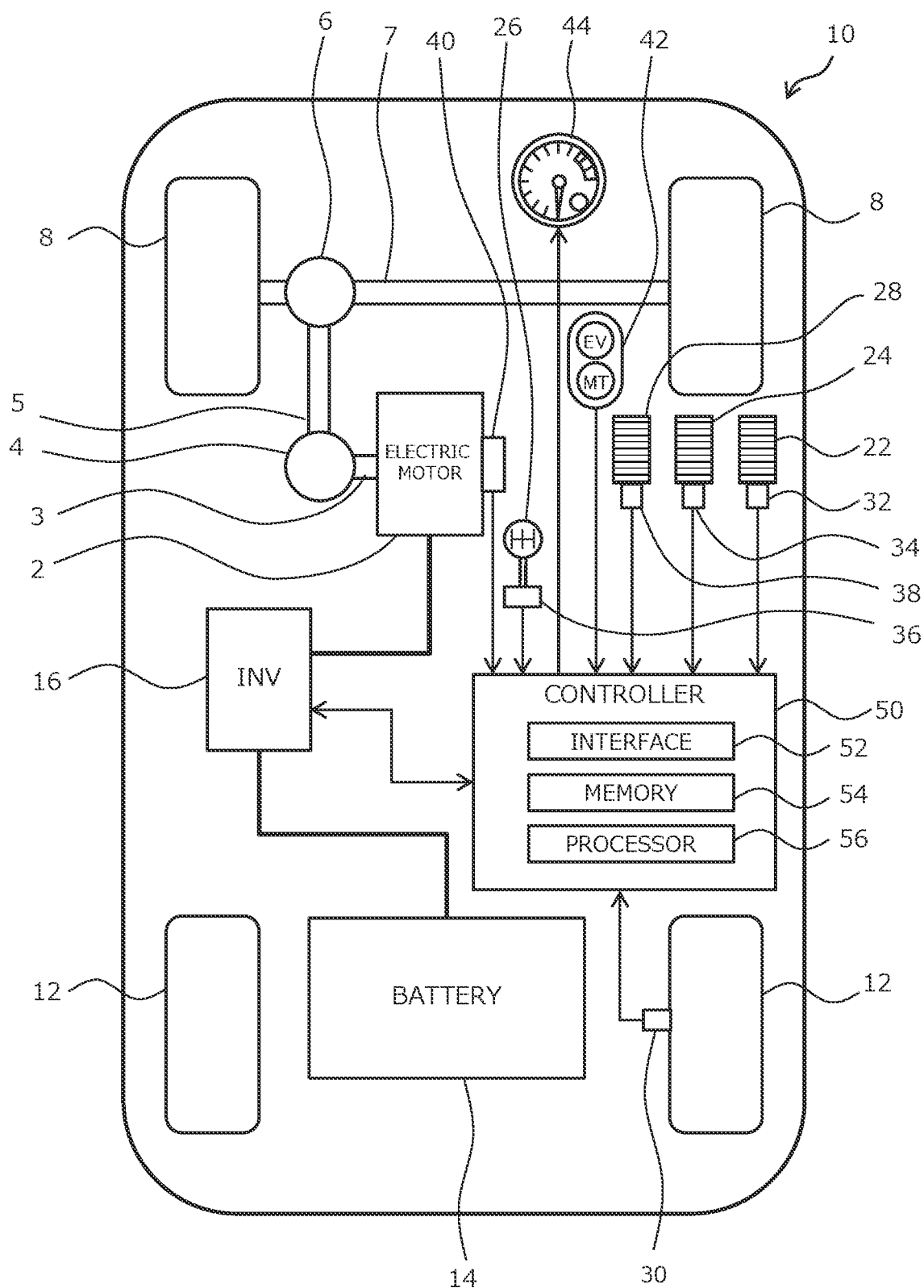
FIG. 1 is a diagram schematically illustrating a configuration of a power system of an electric vehicle according to a present embodiment.

Hereinafter, an embodiment of the present disclosure will be described with reference to the accompanying drawings. However, it is to be understood that even when the number, quantity, amount, range or other numerical attribute of each element is mentioned in the following description of the embodiment, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiment is not necessarily essential to the present disclosure unless explicitly described otherwise, or unless the present disclosure is explicitly specified by the structures or the like theoretically. In the drawings, the same or corresponding parts of are denoted by the same reference numerals, and duplicate descriptions thereof are appropriately simplified or omitted.

EMBODIMENT

1. Configuration of Electric Vehicle

FIG. 1 is a diagram schematically illustrating a configuration of a power system of an electric vehicle 10 according to the present embodiment. As shown in FIG. 1, the electric vehicle 10 includes an electric motor 2 as a power source. The electric motor 2 is, for example, a brushless DC motor or a three-phase AC synchronous motor. The electric motor 2 is provided with a rotation speed sensor 40 for detecting its rotation speed. An output shaft 3 of the electric motor 2 is connected to one end of a propeller shaft 5 via a gear mechanism 4. The other end of the propeller shaft 5 is connected to a drive shaft 7 in front of the vehicle via a differential gear 6.

The electric vehicle 10 includes drive wheels 8, which are front wheels, and driven wheels 12, which are rear wheels. Each drive wheel 8 is provided on both ends of the drive shaft 7. Each wheel 8 and 12 is provided with a wheel speed sensor 30. In FIG. 1, only the wheel speed sensor 30 of the right-rear wheel is represented. The wheel speed sensor 30 is also used as a vehicle speed sensor for detecting the vehicle speed of the electric vehicle 10. The wheel speed sensor 30 is connected to a controller 50 to be described later by an in-vehicle network such as a CAN (Controller Area Network).

The electric vehicle 10 includes a battery 14 and an inverter 16. The battery 14 stores electrical energy that drives the electric motor 2. The inverter 16 converts DC power input from the battery 14 into driving power for the electric motor 2. Power conversion by the inverter 16 is performed by PWM (Pulse Wave Modulation) control by the controller 50. The inverter 16 is connected to the controller 50 by the in-vehicle network.

The electric vehicle 10 includes an accelerator pedal 22 for inputting an acceleration request and a brake pedal 24 for inputting a braking request as an operation request input devices for inputting an operation requests to the electric vehicle 10 by the driver. The accelerator pedal 22 is provided with an accelerator position sensor 32 for detecting an accelerator opening degree Pap [%] which is an operation amount of the accelerator pedal 22. The brake pedal 24 is provided with a brake position sensor 34 for detecting a brake depression amount which is an operation amount of the brake pedal 24. The accelerator position sensor 32 and the brake position sensor 34 are connected to the controller 50 by the in-vehicle network.

The electric vehicle 10 further includes a pseudo-shift lever (pseudo-shifter) 26 and a pseudo-clutch pedal 28 as operation input devices. A shift lever (shifter) and a clutch pedal are devices that operate a manual transmission (MT), but, of course, the electric vehicle 10 is not equipped with the MT. The pseudo-shift lever 26 and the pseudo-clutch pedal 28 are dummies that differ from the original shift lever or clutch pedal.

The pseudo-shift lever 26 has a structure that simulates a shift lever provided by a MT vehicle. The arrangement and operating feeling of the pseudo-shift lever 26 is equivalent to the actual MT vehicle. he pseudo-shift lever 26 has positions that correspond to each gear stage, for example, 1st gear stage, 2nd gear stage, 3rd gear stage, 4th gear stage, 5th gear stage, 6th gear stage, reverse stage, and neutral stage. The pseudo-shift lever 26 is provided with a shift position sensor 36 for detecting gear stage by determining which position the pseudo-shift lever 26 is in. The shift position sensor 36 is connected to the controller 50 by the in-vehicle network.

The pseudo-clutch pedal 28 has a structure that simulates a clutch pedal provided in the MT vehicle. The arrangement and operating feeling of the pseudo-clutch pedal 28 are equivalent to those of the real MT vehicle. The driver depresses the pseudo-clutch pedal 28 when it is desired to change the setting of the gear stage by the pseudo-shift lever 26, and when the setting change of the gear stage is completed, the driver stops depressing and returns the pseudo-clutch pedal 28 to its original state. The pseudo-clutch pedal 28 is provided with a clutch position sensor 38 for detecting depression amount Pc [%] which is an operation amount of the pseudo-clutch pedal 28. The clutch position sensor 38 is connected to the controller 50 by the in-vehicle network.

The electric vehicle 10 is equipped with a pseudo-engine speed meter 44. An engine speed meter is a device that displays a rotation speed of an internal combustion engine to the driver, but of course, the electric vehicle 10 is not equipped with the internal combustion engine. The pseudo-engine speed meter 44 is, of course, a dummy that differs from the original engine speed meter. The pseudo-engine speed meter 44 has a structure that simulates the engine speed meter installed in the conventional vehicle. The pseudo-engine speed meter 44 may be a mechanical type or a liquid crystal display type. Alternatively, a projection display type using a head-up display may be used. In the case of the liquid crystal display type or the projection display type, a revolution limit may be arbitrarily set in the pseudo-engine speed meter 44. The pseudo-engine speed meter 44 is connected to the controller 50 by the in-vehicle network.

The electric vehicle 10 is equipped with a mode selection switch 42. The mode selection switch 42 is a switch for selecting a traveling mode of the electric vehicle 10. The traveling mode of the electric vehicle 10 includes an MT mode and an EV mode. The mode selection switch 42 is configured to be able to arbitrarily select either the MT mode or the EV mode. Although details will be described later, in the MT mode, the electric motor 2 is controlled in the control mode for driving the electric vehicle 10 like the MT vehicle (first mode). In the EV mode, the electric motor 2 is controlled in the normal control mode for the common electric vehicle (second mode). The mode selection switch 42 is connected to the controller 50 by the in-vehicle network.

Figure 2:
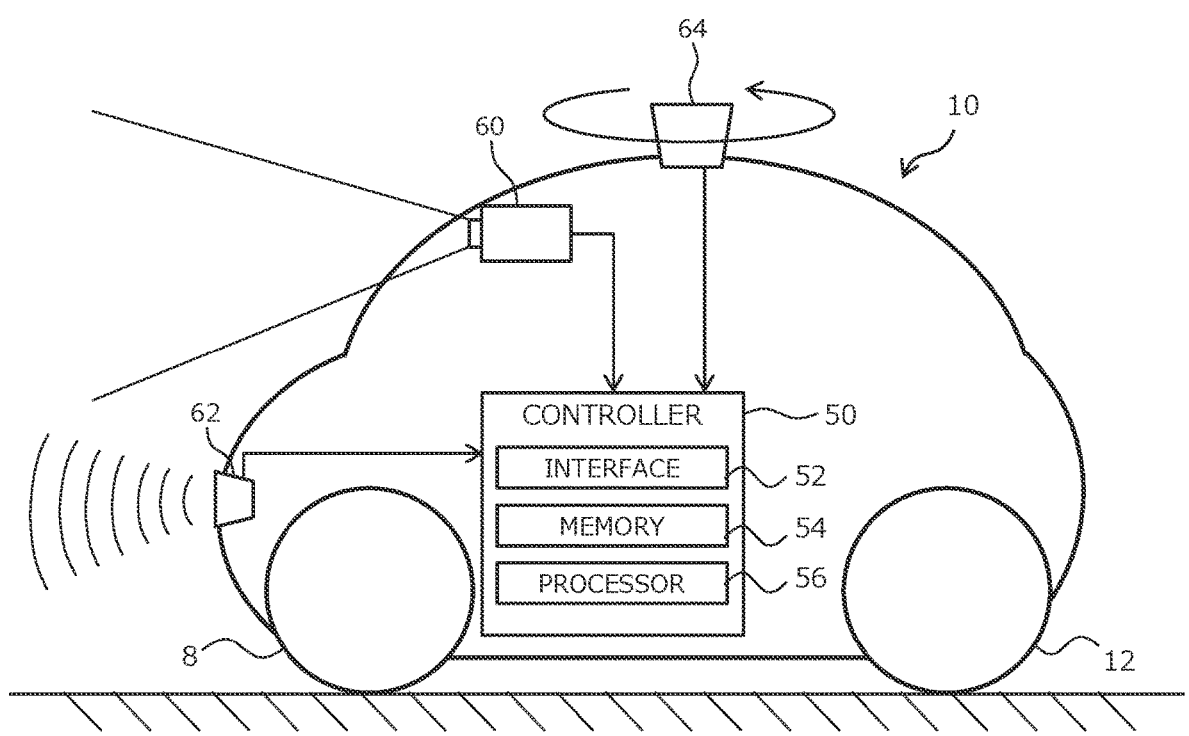
FIG. 2 is a diagram schematically illustrating a configuration of an information collection system of the electric vehicle according to the present embodiment.

FIG. 2 is a diagram schematically illustrating a configuration of an information collection system of the electric vehicle 10 according to the present embodiment. As shown in FIG. 2, the electric vehicle 10 includes a camera 60, a radar 62, and a LIDAR 64 as external sensors for detecting conditions in which the vehicle is placed. The camera 60 is mounted so as to image at least the front of the vehicle. The camera 60 is, for example, a stereo camera equipped with a CMOS image sensor. The radar 62 is specifically a millimeter wave radar and is attached to the front portion of the vehicle. The LIDAR 64 is mounted, for example, on the roof of the vehicle. These external sensors 60, 62, 64 are connected to the controller 50 by the in-vehicle network.

The controller 50 is typically an ECU (Electronic Control Unit) mounted on the electric vehicle 10. The controller 50 may be a combination of a plurality of ECUs. The controller 50 includes an interface 52, a memory 54, and a processor 56. The in-vehicle network is connected to the interface 52. The memory 54 includes a RAM (Random Access Memory) for temporarily recording data and a ROM (Read Only Memory) for storing a control program executable by the processor 56 and various data related to the control program. The processor 56 reads out and executes the control program and data from the memory 54, and generates a control signal based on a signal acquired from each sensor.

Figure 3:
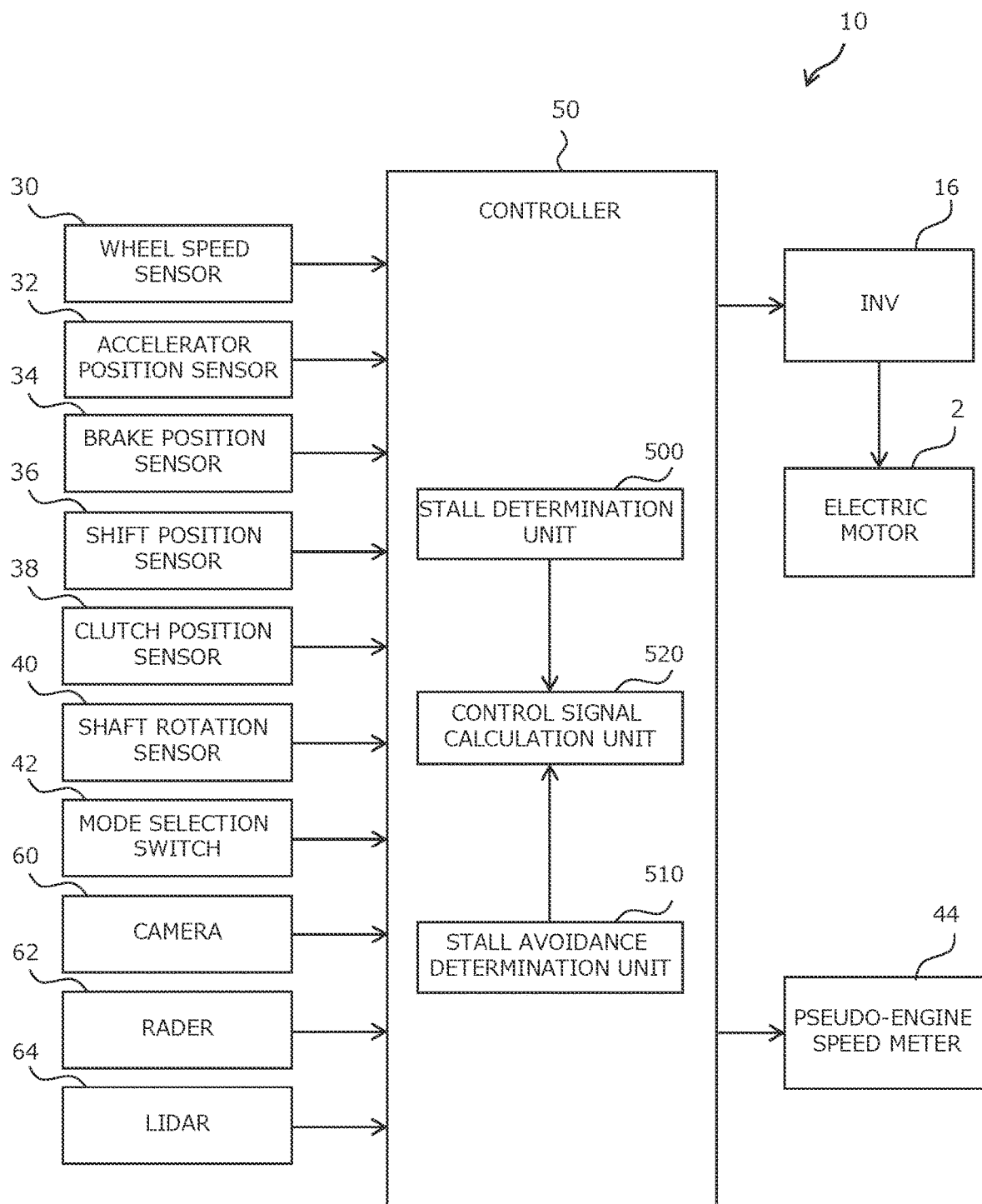
FIG. 3 is a block diagram illustrating a configuration of a control system of the electric vehicle shown in FIG. 1.

FIG. 3 is a block diagram illustrating a configuration of a control system of the electric vehicle 10 according to the present embodiment. The controller 50 receives signals at least from the wheel speed sensor 30, the accelerator position sensor 32, the brake position sensor 34, the shift position sensor 36, the clutch position sensor 38, the rotation speed sensor 40, and the mode selection switch 42. The in-vehicle network is used for communication between these sensors and the controller 50. Although not shown, in addition to these sensors, various other sensors are mounted on the electric vehicle 10, and connected to the controller 50 by the in-vehicle network.

Further, a signal is output from the controller 50 to at least the inverter 16 and the pseudo-engine speed meter 44. The in-vehicle network is used for communication between these devices and the controller 50. Although not shown, in addition to these devices, various other actuators and indicators are mounted on the electric vehicle 10, and connected to the controller 50 by the in-vehicle network.

The controller 50 has a function as a stall determination unit 500, a function as a stall avoidance determination unit 510, and a function as a control signal calculation unit 520. More specifically, when the processor 56 executes a program stored in the memory 54, the processor 56 functions as at least the stall determination unit 500, the stall avoidance determination unit 510, and the control signal calculation unit 520. The control signal calculation is a function to calculate a control signal for an actuator or a device. The control signal includes at least a signal for PWM control of the inverter 16 and a signal for displaying information on the pseudo-engine speed meter 44. These functions of the controller 50 will be described below.

2. Functions of Controller 2-1. Motor Torque Calculation Function

Figure 4:
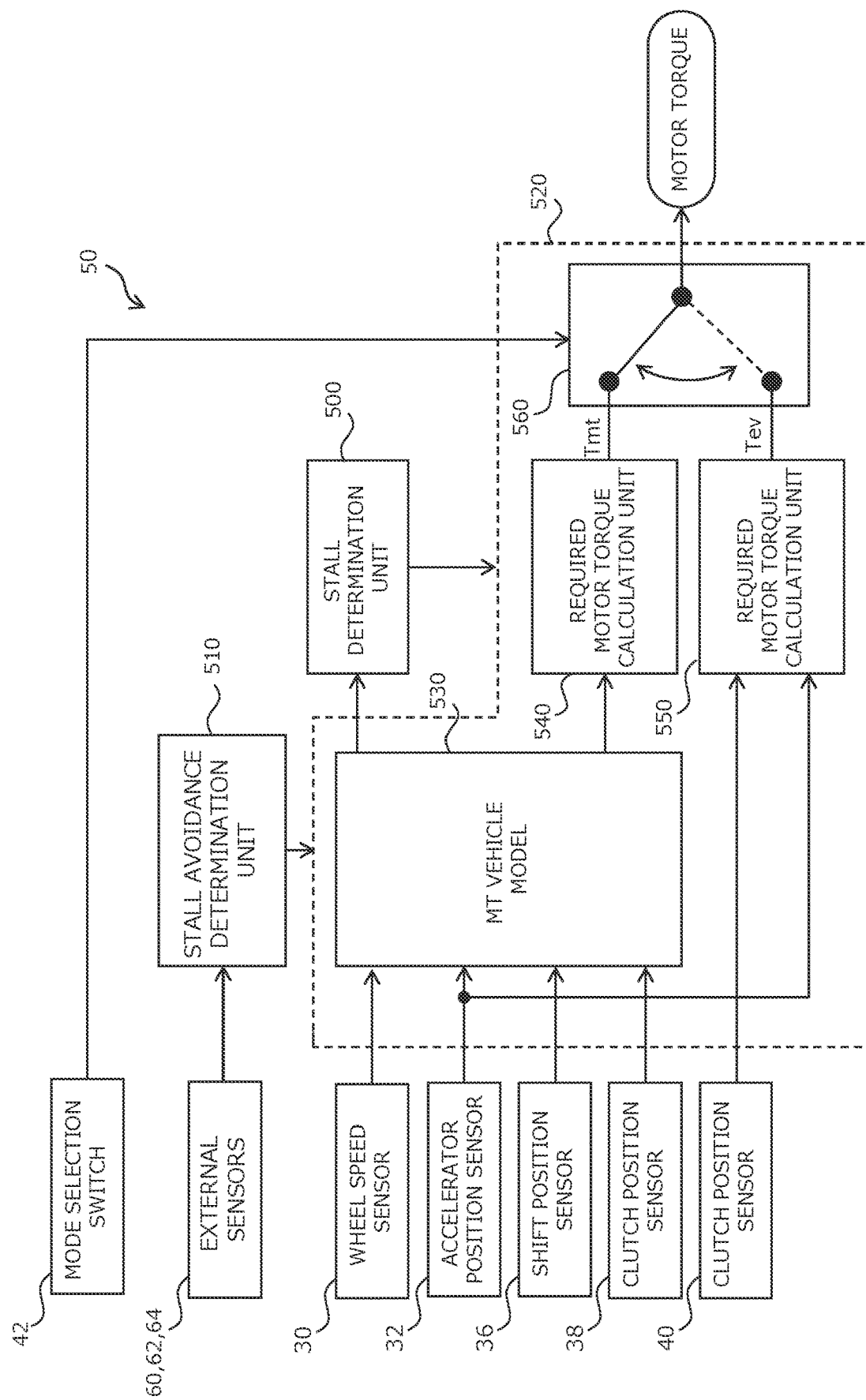
FIG. 4 is a block diagram showing a function of a controller of the electric vehicle shown in FIG. 1.

FIG. 4 is a block diagram illustrating functions of the controller 50 according to the present embodiment, in particular, a function relating to a calculation of the motor torque command value for the electric motor 2. The controller 50 calculates the motor torque command value by the function shown in this block diagram, and generates the control signal for the PWM control of the inverter 16 based on the motor torque command value.

As shown in FIG. 3, the control signal calculation unit 520 includes an MT vehicle model 530, a required motor torque calculation unit 540, a motor torque command map 550, and a changeover switch 560. The control signal calculation unit 520 receives signals from the wheel speed sensor 30, the accelerator position sensor 32, the shift position sensor 36, the clutch position sensor 38, the rotation speed sensor 40, and the mode selection switch 42. The control signal calculation unit 520 processes the signals from these sensors and calculates motor torque which the electric motor 2 is made to output.

The calculation of the motor torque by the control signal calculation unit 520 includes two calculations using the MT vehicle model 530 and the required motor torque calculation unit 540, and the calculation using the motor torque command map 550. The former is used to calculate the motor torque when the electric vehicle 10 is to travel in the MT mode. The latter is used to calculate the motor torque when the electric vehicle 10 is to travel in the EV mode. Which motor torque is used is determined by the changeover switch 560. The changeover switch 560 operates by a signal input from the mode selection switch 42.

2-2. Calculation of Motor torque in MT Mode

The driving wheel torque in the MT vehicle is determined by the operation of a gas pedal that controls fuel supply to the engine, the operation of a shift lever (shifter) that switches the gear stage of the MT, and the operation of a clutch pedal that operates a clutch between the engine and the MT. The MT vehicle model 530 is a model that calculates the driving wheel torque obtained by the operation of the accelerator pedal 22, the pseudo-clutch pedal 28, and the pseudo-shift lever 26 assuming that the electric vehicle 10 is equipped with the engine, the clutch, and the MT. Hereinafter, in the MT mode, the engine, the clutch, and the MT virtually realized by the MT vehicle model 530 are referred to as a virtual engine, a virtual clutch, and a virtual MT.

The MT vehicle model 530 receives a signal of the accelerator position sensor 32 as an operation amount of the gas pedal of the virtual engine. A signal of the shift position sensor 36 is input to the MT vehicle model 530 as a shift position of the shifter of the virtual MT. Further, a signal of the clutch position sensor 38 is input to the MT vehicle model 530 as an operation amount of the clutch pedal of the virtual clutch. The signal of the wheel speed sensor 30 is also input to the MT vehicle model 530 as a signal indicating the load condition of the vehicle. The MT vehicle model 530 is a model simulating the torque characteristic of the driving wheel torque in the MT vehicle. The MT vehicle model 530 is configured so that the operation of the accelerator pedal 22, the pseudo-shift lever 26, and the pseudo-clutch pedal 28 by the driver is reflected in the value of the driving wheel torque. Details of the MT vehicle model 530 will be described later.

The required motor torque calculation unit 540 converts the driving wheel torque calculated by the MT vehicle model 530 to a required motor torque. The required motor torque is the motor torque required for realizing the driving wheel torque calculated by the MT vehicle model 530. The reduction ratio from the output shaft 3 of the electric motor 2 to the driving wheels 8 is used to convert the driving wheel torque into the required motor torque.

2-3. Calculation of Motor Torque in EV Mode

Figure 5:
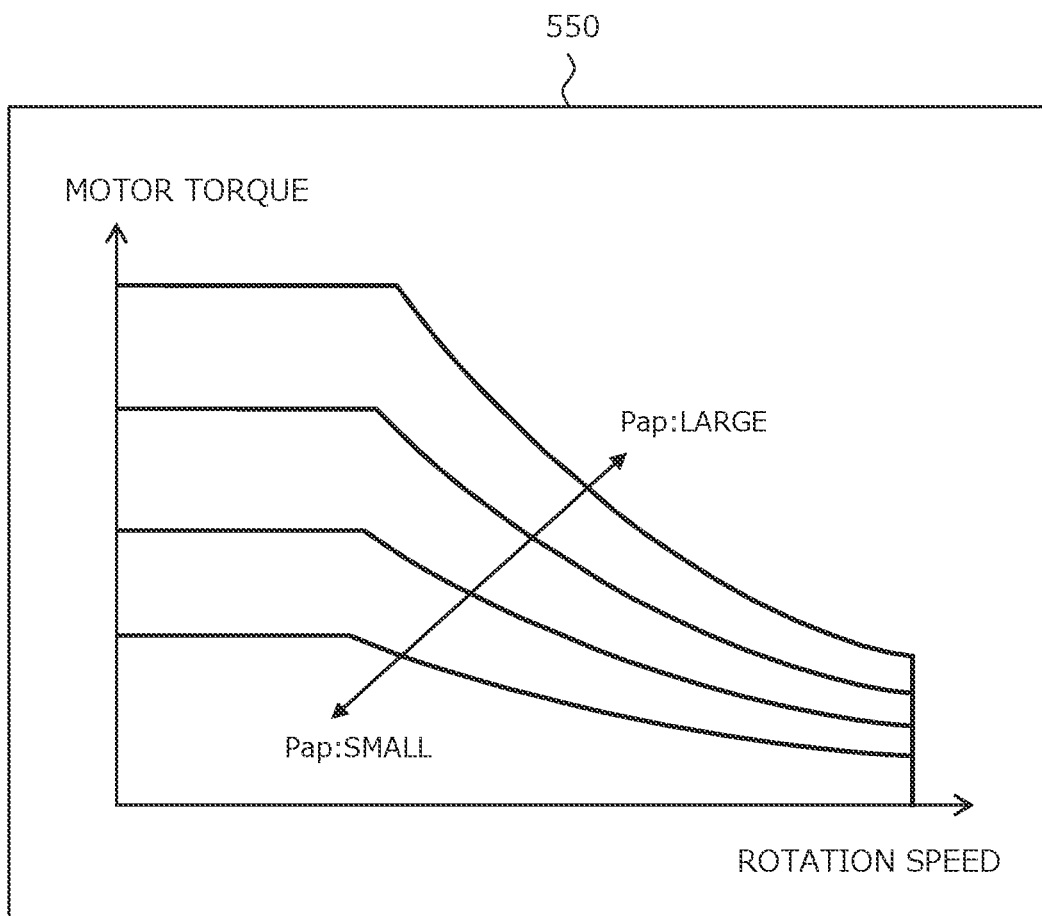
FIG. 5 is a diagram showing an example of a motor torque command map included in the controller shown in FIG. 4.

FIG. 5 is a diagram illustrating an example of the motor torque command map 550 used for calculating the motor torque in the EV mode. The motor torque command map 550 is a map to determine the motor torque using the accelerator opening Pap and the rotation speed of the electric motor 2 as parameters. A signal of the accelerator position sensor 32 and a signal of the rotation speed sensor 40 are input to the respective parameters of the motor torque command map 550. The motor torque corresponding to these signals is output from the motor torque command map 550.

2-4. Switching of Motor Torque

The motor torque calculated using the motor torque command map 550 is denoted as Tev, and the motor torque calculated using the MT vehicle model 530 and the required motor torque calculation unit 540 is denoted as Tmt. The motor torque selected by the changeover switch 560 among the two motor torques Tev and Tmt is given as the motor torque command value for the electric motor 2.

In the EV mode, the operation is not reflected in the operation of the electric vehicle 10 even if the driver operates the pseudo-shift lever 26 or the pseudo-clutch pedal 28. That is, in the EV mode, the operation of the pseudo-shift lever 26 and the operation of the pseudo-clutch pedal 28 are disabled. However, even while the motor torque Tev is output as the motor torque command value, the calculation of the motor torque Tmt using the MT vehicle model 530 is continued. Conversely, the calculation of the motor torque Tev is continued even while the motor torque Tmt is output as the motor torque command value. That is, both the motor torque Tev and the motor torque Tmt are continuously input to the changeover switch 560.

By switching the input by the changeover switch 560, the motor torque command value is switched from the motor torque Tev to the motor torque Tmt, or from the motor torque Tmt to the motor torque Tev. At this time, when there is a deviation between the two motor torques, a torque level difference is generated with switching. Therefore, for a while after switching, so as not to cause a sudden change in torque, the gradual change process is performed on the motor torque command value. For example, in the switching from the EV mode to the MT mode, the motor torque command value is not immediately switched from the motor torque Tev to the motor torque Tmt, it is changed toward the motor torque Tmt at a predetermined rate of change. The same process is performed in switching from the MT mode to the EV mode.

The changeover switch 560 operates in accordance with the traveling mode selected by the mode selection switch 42. When the EV mode is selected by the mode selection switch 42, the changeover switch 560 connects to the motor torque command map 550 and outputs the motor torque Tev input from the motor torque command map 550 as a motor torque command value. When the MT mode is selected by the mode selection switch 42, the changeover switch 560 switches the connection destination to the required motor torque calculation unit 540. Then, the changeover switch 560 outputs the motor torque Tmt input from the required motor torque calculation unit 540 as the motor torque command value. Such switching of the input is performed in conjunction with the selection of the traveling mode by the mode selection switch 42.

2-5. MT Vehicle Model 2-5-1. Overview

Figure 6:
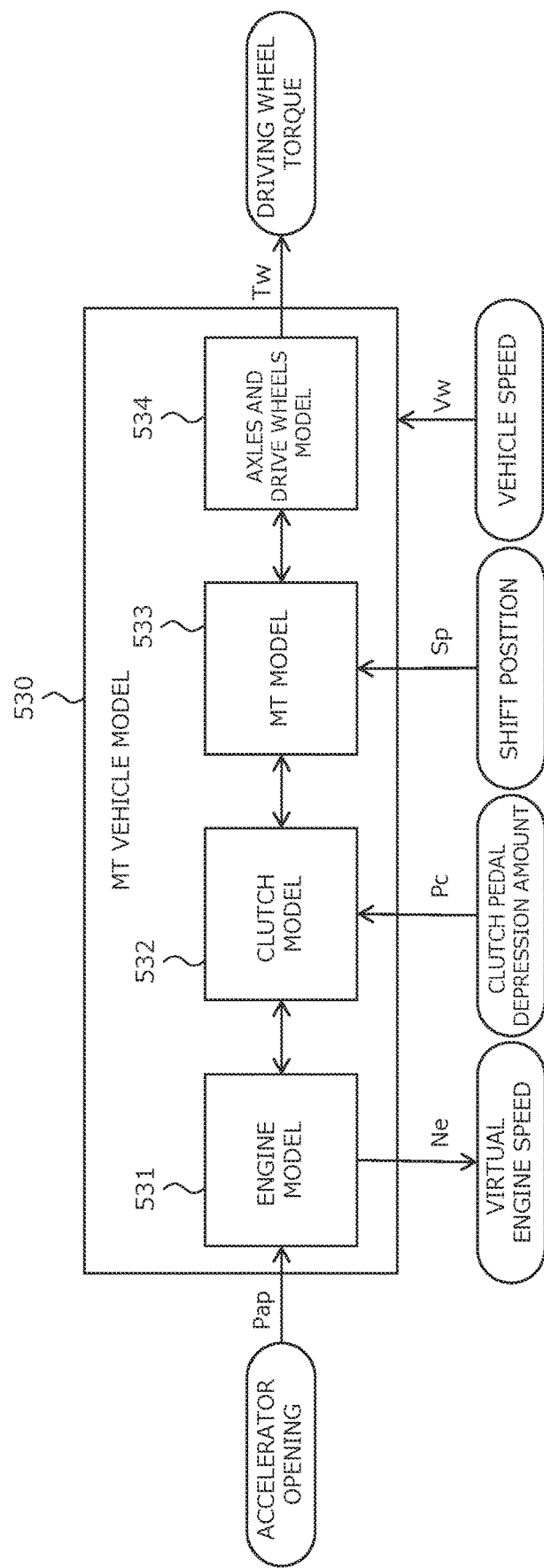
FIG. 6 is a block diagram showing an example of an MT vehicle model included in the controller shown in FIG. 4.

Next, the MT vehicle model 530 will be described. FIG. 6 is a block diagram illustrating an example of the MT vehicle model 530. The MT vehicle model 530 includes an engine model 531, a clutch model 532, an MT model 533, and an axles and drive wheels model 534. In the engine model 531, the virtual engine is modeled. In the clutch model 532, the virtual clutch is modeled. In the MT model 533, the virtual MT is modeled. In the axles and drive wheels model 534, the virtual torque transmission system from the axles to the drive wheels is modeled. Each model may be represented by a calculation formula or may be represented by a map.

Calculation results are input and output between the models. Further, the accelerator opening degree Pap detected by the accelerator position sensor 32 is input to the engine model 531. The clutch pedal depressing amount Pc detected by the clutch position sensor 38 is input to the clutch model 532. The shift position Sp detected by the shift position sensor 36 is input to the MT model 533. In addition, in the MT vehicle model 530, the vehicle speed Vw (or wheel speed) detected by the wheel speed sensor 30 is used in a plurality of models. In the MT vehicle model 530, a driving wheel torque Tw and a virtual engine speed Ne is calculated based on these input signals.

2-5-2. Engine Model

The engine model 531 calculates the virtual engine speed Ne and the virtual engine output torque Teout. The engine model 531 includes a model to calculate the virtual engine speed Ne and a model to calculate the virtual engine output torque Teout. For the calculation of the virtual engine speed Ne, for example, a model represented by the following equation (1) is used. In the following equation (1), the virtual engine speed Ne is calculated from a rotational speed "Nw" of the wheel 8, a total reduction ratio "R", and a slip ratio "slip" of the virtual clutch.

$$Ne = Nw \times R \times \frac{1}{1 - \text{slip}} \quad (1)$$

In the equation (1), the rotation speed Nw of the wheel 8 is detected by the wheel speed sensor 30. The total reduction ratio R is calculated from the gear ratio (transmission ratio) r calculated by the MT model 533 to be described later and the reduction ratio specified by the axles and drive wheels model 534. The slip ratio "slip" is calculated by the clutch model 532 to be described later. The virtual engine speed Ne is displayed on the pseudo-engine speed meter 44 when the MT mode is selected.

Equation (1) is a calculation equation of the virtual engine speed Ne in a condition where the virtual engine and the virtual MT are engaged by the virtual clutch. When the virtual clutch is disengaged, the virtual engine torque Te generated in the virtual engine can be regarded as being used to increase the virtual engine speed Ne. The virtual engine torque Te is the torque obtained by adding a torque due to the moment of inertia to the virtual engine output torque Teout. When the virtual clutch is disengaged, the virtual engine power torque Teout is zero. Therefore, when the virtual clutch is disengaged, the engine model 531 calculates the virtual engine speed Ne by the following equation (2) using the virtual engine torque Te and the moment of inertia "J" of the virtual engine. For the calculation of the virtual engine torque Te, a map with accelerator opening Pap as a parameter is used.

$$J \times \frac{30}{\pi} \times \frac{d}{dt} Ne = Te \quad (2)$$

Incidentally, during idling of the MT vehicle, idle speed control (ISC control) is executed to maintain the engine speed at a constant engine speed. Therefore, the engine model 531 calculates the virtual engine speed Ne as a predetermined idling speed (for example, 1000 rpm), when the virtual clutch is disengaged, the vehicle speed is 0, and the accelerator opening Pap is 0%. When the driver depresses the accelerator pedal 22 to perform revving or blipping while the vehicle is stopped, the idling speed is used as the initial value of the virtual engine speed Ne calculated by equation (2).

Figure 7:
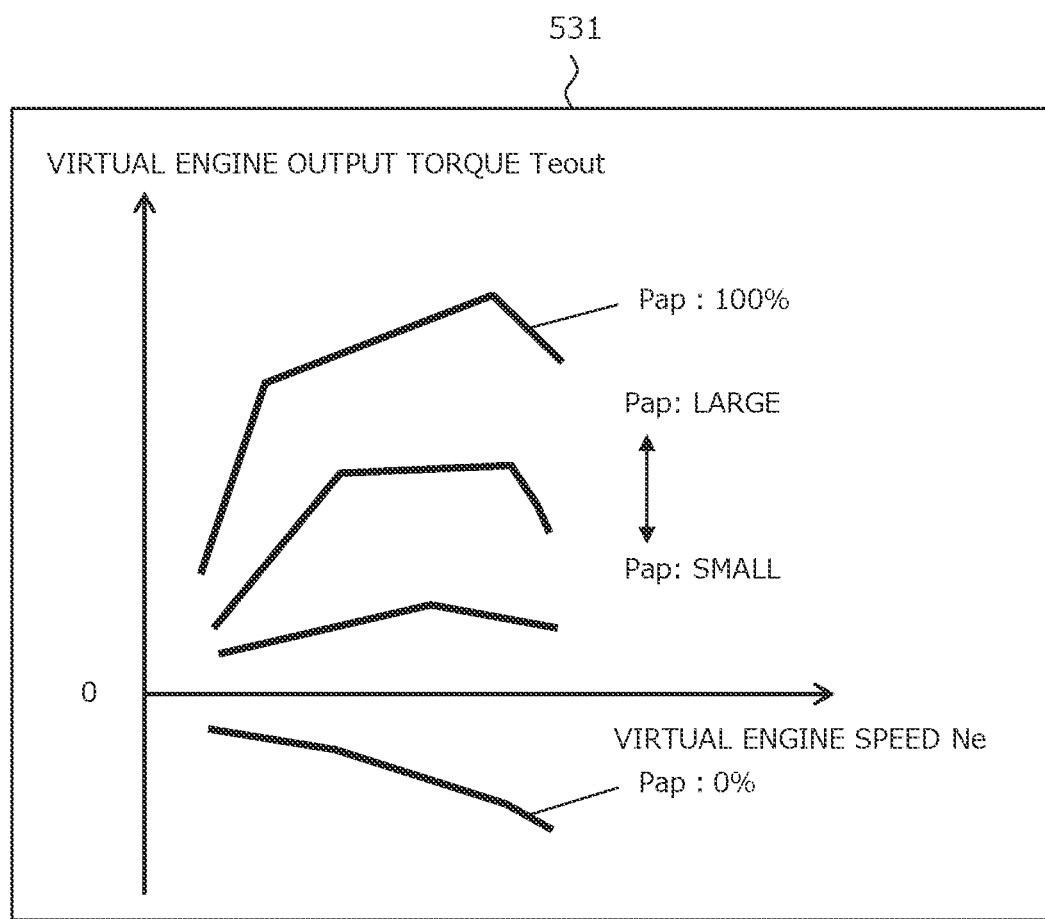
FIG. 7 is a diagram illustrating an example of an engine model constituting the MT vehicle model shown in FIG. 6.

The engine model 531 calculates the virtual engine output torque Teout from the virtual engine speed Ne and the accelerator opening Pap. For calculating the virtual engine power torque Teout, for example, a two-dimensional map as shown in FIG. 7 is used. This two-dimensional map is a map which regulates the relation between the accelerator opening Pap in steady-state, the virtual engine speed Ne, and the virtual engine output torque Teout. In this map, the virtual engine power torque Teout for the virtual engine speed Ne is given for each accelerator opening Pap. The torque characteristic shown in FIG. 7 can be set to the characteristic assumed for a gasoline engine or can be set to those assumed for a diesel engine. In addition, the torque characteristic can be set to assume a natural intake engine or a turbocharged engine. For example, an HMI unit (Human Machine Interface) may be installed in the vicinity of an instrument panel, and the driver may switch the virtual engine in the MT mode to a desired setting by operating the HMI unit. The virtual engine output torque Teout calculated by the engine model 531 is output to the clutch model 532.

2-5-3. Clutch Model

Figure 8:
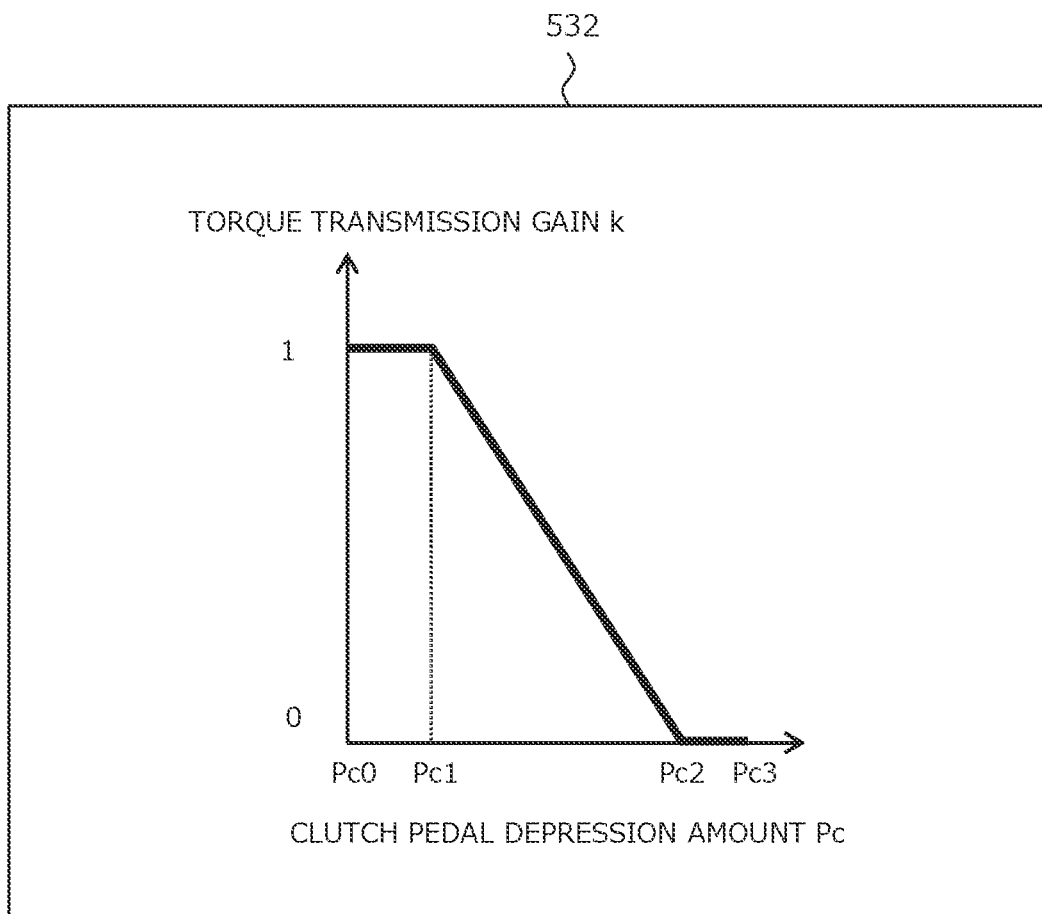
FIG. 8 is a diagram illustrating an example of a clutch model constituting the MT vehicle model shown in FIG. 6.

The clutch model 532 calculates a torque transmission gain k. The torque transmission gain k is a gain for calculating the torque transmission degree of the virtual clutch corresponding to the depression amount of the pseudo-clutch pedal 28. The clutch model 532 has, for example, a map as shown in FIG. 8. In this map, the torque transmission gain k is given for the clutch pedal depression amount Pc. In FIG. 8, the torque transmission gain k becomes 1 when that the clutch pedal depression amount Pc is in the range from Pc0 to Pc1, the clutch pedal depression amount Pc monotonically decreases at a constant slope toward zero when the clutch pedal depression amount Pc is in the range from Pc1 to Pc2, and the clutch pedal depression amount Pc becomes 0 when the clutch pedal depression amount Pc is in the range from Pc2 to Pc3. Here, Pc0 corresponds to the clutch pedal depression amount Pc of 0%, Pc1 corresponds to the play limit when the clutch pedal is depressed, Pc3 corresponds to the clutch pedal depression amount Pc of 100%, and Pc2 corresponds to the play limit when the clutch pedal is returned from Pc3.

The map shown in FIG. 8 is an example, and the change in the torque transmission gain k with respect to an increase in the clutch pedal depression amount Pc is not limited to the change curve as long as it is a broad monotonic decrease toward 0. For example, the change in torque transmission gain k in the range from Pc1 to Pc2 may be a monotonically decreasing curve that is convex upward or a monotonically decreasing curve that is convex downward.

The clutch model 532 calculates a clutch output torque Tcout using the torque transmission gain k. The clutch output torque Tcout is the torque output from the virtual clutch. The clutch model 532 calculates the clutch output torque Tcout from the virtual engine output torque Teout and the torque transmission gain k by, for example, the following equation (3). The clutch output torque Tcout calculated by the clutch model 532 is output to the MT model 533.

$$Tcout = Teout \times k \quad (3)$$

Further, the clutch model 532 calculates the slip ratio "slip". The slip ratio "slip" is used to calculate the virtual engine speed Ne in the engine model 531. For calculating the slip ratio "slip", a map in which the slip ratio "slip" is given to the clutch pedal depression amount Pc can be used, in the similar way as for the calculating the torque transmission gain k. Instead of such a map, the slip ratio "slip" may be calculated from the torque transmission gain k by the following equation (4) representing the relation between the slip ratio "slip" and the torque transmission gain k.

$$slip = 1 - k \quad (4)$$

2-5-4. MT Model

Figure 9:
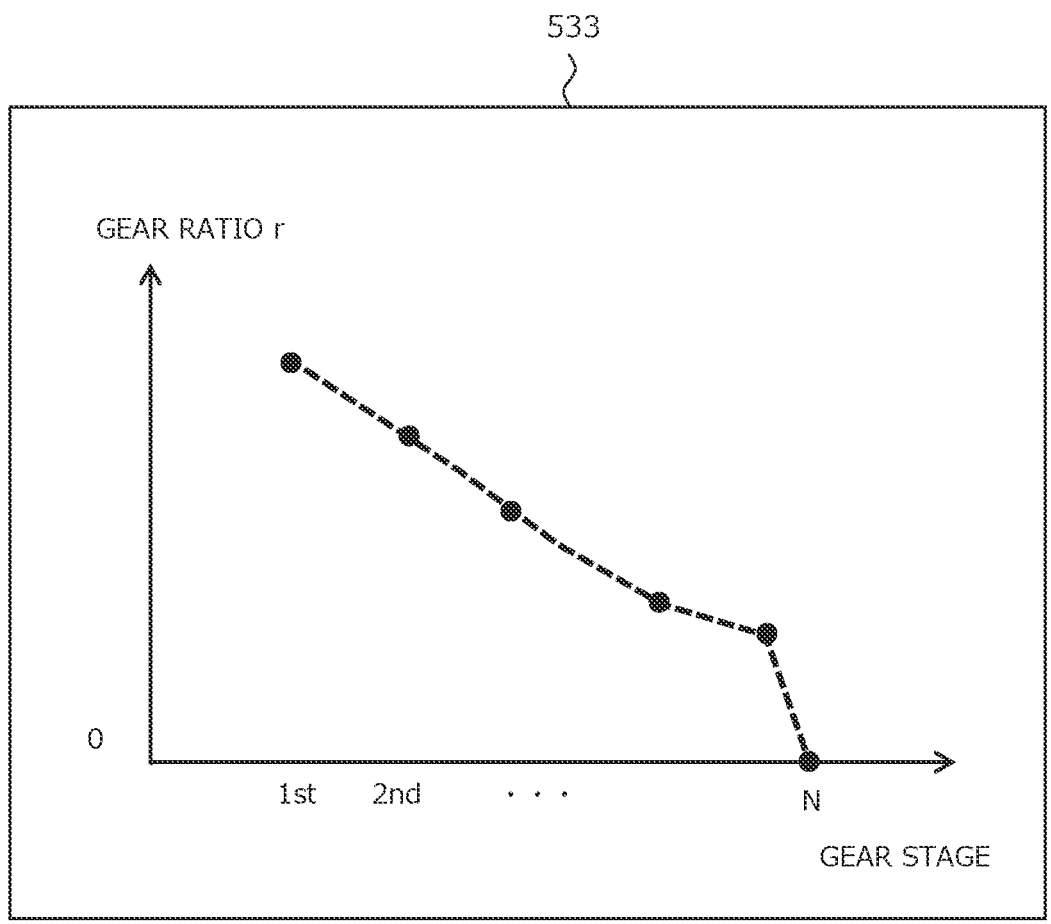
FIG. 9 is a diagram illustrating an example of an MT model constituting the MT vehicle model shown in FIG. 6.

The MT model 533 calculates the gear ratio r. The gear ratio r is a gear ratio determined by the shift position Sp of the pseudo-shift lever 26 in the virtual MT. The shift position Sp of the pseudo-shift lever 26 and the gear stage of the virtual MT is in a one-to-one relationship. The MT model 533 has, for example, a map as shown in FIG. 9. In this map, the gear ratio r is given for the gear stage. As shown in FIG. 8, the larger the gear stage, the smaller the gear ratio r.

The MT model 533 calculates a transmission output torque Tgout using the gear ratio r. The transmission output torque Tgout is the torque output from the virtual transmission. The MT model 533 calculates the transmission output torque Tgout from the clutch output torque Tcout and the gear ratio r by, for example, the following equation (5). The transmission output torque Tgout calculated by the MT model 533 is output to the axles and drive wheels model 534.

$$Tgout = Tcout \times r \quad (5)$$

2-5-5. Axles and Drive Wheels Model

The axles and drive wheels model 534 calculates the driving wheel torque Tw using a predetermined reduction ratio rr. The reduction ratio rr is a fixed value determined by the mechanical structure from the virtual MT to the driving wheels 8. The value obtained by multiplying the reduction ratio rr by the gear ratio r is the total reduction ratio R described above. The axles and driving wheels model 534, for example, calculates the driving wheel torque Tw from the transmission output torque Tgout and the reduction ratio rr, for example, by the following equation (6). The driving wheel torque Tw calculated by the axles and driving wheels model 534 is output to the required motor torque calculation unit 540.

$$Tw = Tgout \times rr \quad (6)$$

2-6. Torque Characteristic of Electric Motor to be Realized in MT Mode

Figure 10:
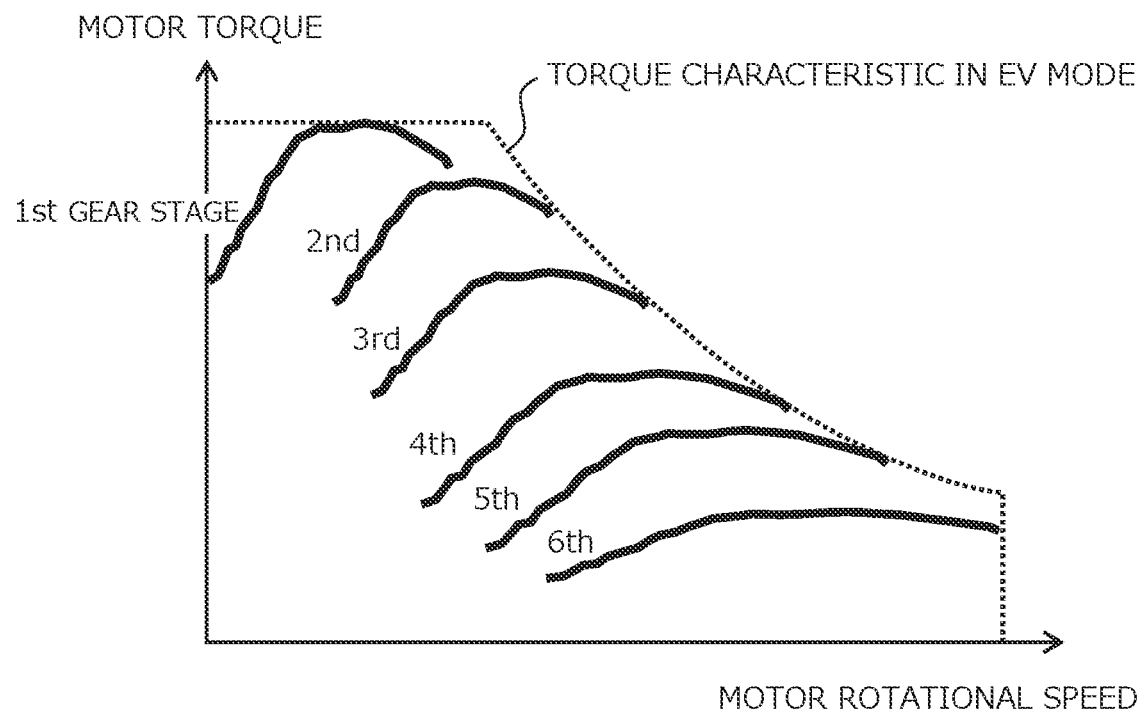
FIG. 10 is a diagram showing the torque characteristic of the electrical motor to be realized in the MT mode in comparison with the torque characteristic of the electric motor to be realized in the EV mode.

The required motor torque calculation unit 540 converts the driving wheel torque Tw calculated by the MT vehicle model 530 into motor torque. FIG. 10 is a diagram showing the torque characteristic of the electrical motor 2 to be realized in the MT mode in comparison with the torque characteristic of the electric motor 2 to be realized in the EV mode. In the case of MT mode, as shown in FIG. 10, it is possible to realize a torque characteristic (solid line in the figure) such as to simulate the torque characteristic of the MT vehicle in accordance with the gear stage set by the pseudo-shift lever 26.

2-7. Stall Production Processing

2-7-1. Overview

Next, the stall production process by the controller 50 will be described. In MT vehicles, it is necessary to operate the accelerator pedal while the clutch pedal is turned off to connect the clutch pedal while adjusting the engine speed when the vehicle starts or shifts. At this time, when an operation to connect the clutch pedal is performed while the engine speed is low, the engine output torque will be lower than a stall limit torque, which may lead to engine stall.

The electric vehicle 10 according to the present embodiment is expected to provide the driver with the pleasure of operating the MT vehicle by the pseudo-shift lever 26 and the pseudo-clutch pedal 28. However, since the electric vehicle 10 is naturally not equipped with an actual engine, it is impossible to feel the driving feeling that the engine actually stalls. This may give a sense of discomfort to the driver who knows the driving sensation of the MT vehicle.

Therefore, in the electric vehicle 10 according to the present embodiment, the controller 50 executes the stall production process for producing the stall of the virtual engine. The stall production process includes a stall determination process by the stall determination unit 500 and a stall avoidance determination process by the stall avoidance determination unit 510.

2-7-2. Stall Determination Process

The stall determination unit 500 determines that the virtual engine is stalled when the virtual engine speed Ne is lower than a prescribed stall limit engine speed Neth in the MT mode. The prescribed stall limit engine speed Neth is a value corresponding to the stall engine speed in MT-vehicles. For example, the stall limit engine speed Neth can be set to any value as long as the engine speed is lower than an idle engine speed. When the engine stall is detected, the stall determination unit 500 outputs a stall instruction signal to the MT vehicle model 530. Upon receiving the stall instruction signal, the MT vehicle model 530 outputs a virtual engine output torque Teout calculated in the engine model 531 is changed to zero. When the virtual engine output torque Teout is zero, the motor torque calculated by the required motor torque calculation unit 540 becomes zero. This causes the electric vehicle 10 to stop as if the engine had stalled.

2-7-3. Stall Avoidance Determination Process

While producing the engine stall is a great way to experience the feeling of driving a MT vehicle, there is also the possibility that drivers will encounter situations that require hard work. For example, in certain situations such as hills, congested roads, or approaching subsequent vehicles, the engine stall production may induce a rear-end collision or traffic turbulence. When priority is given to safety, security, and smooth traffic flow for the driver, it is preferable to avoid the engine stall production in such a specific situation.

Therefore, the controller 50 avoids the engine stall production in specific situations of traveling where the engine stall should be avoided. Each signal is input from the external sensors 60, 62, and 64 to the stall avoidance determination unit 510. From the signals of the external sensors 60, 62, 64, it is possible to obtain information about the situation in which the vehicle is placed. The stall avoidance determination unit 510 determines whether the vehicle is in the specific situation in which the avoidance of the engine stall should be performed, in consideration of the obtained information. The stall avoidance determination unit 510 outputs a stall avoidance signal to the MT vehicle model 530 when the specific situation is detected. Upon receiving the stall avoidance signal, the MT vehicle model 530 outputs the virtual engine output torque Teout computed in the engine model 531 as is. This allows the electric vehicle 10 to maintain traveling in the MT mode without producing the engine stall.

2-7-4. Procedure of Stall Production Processing

Figure 11:
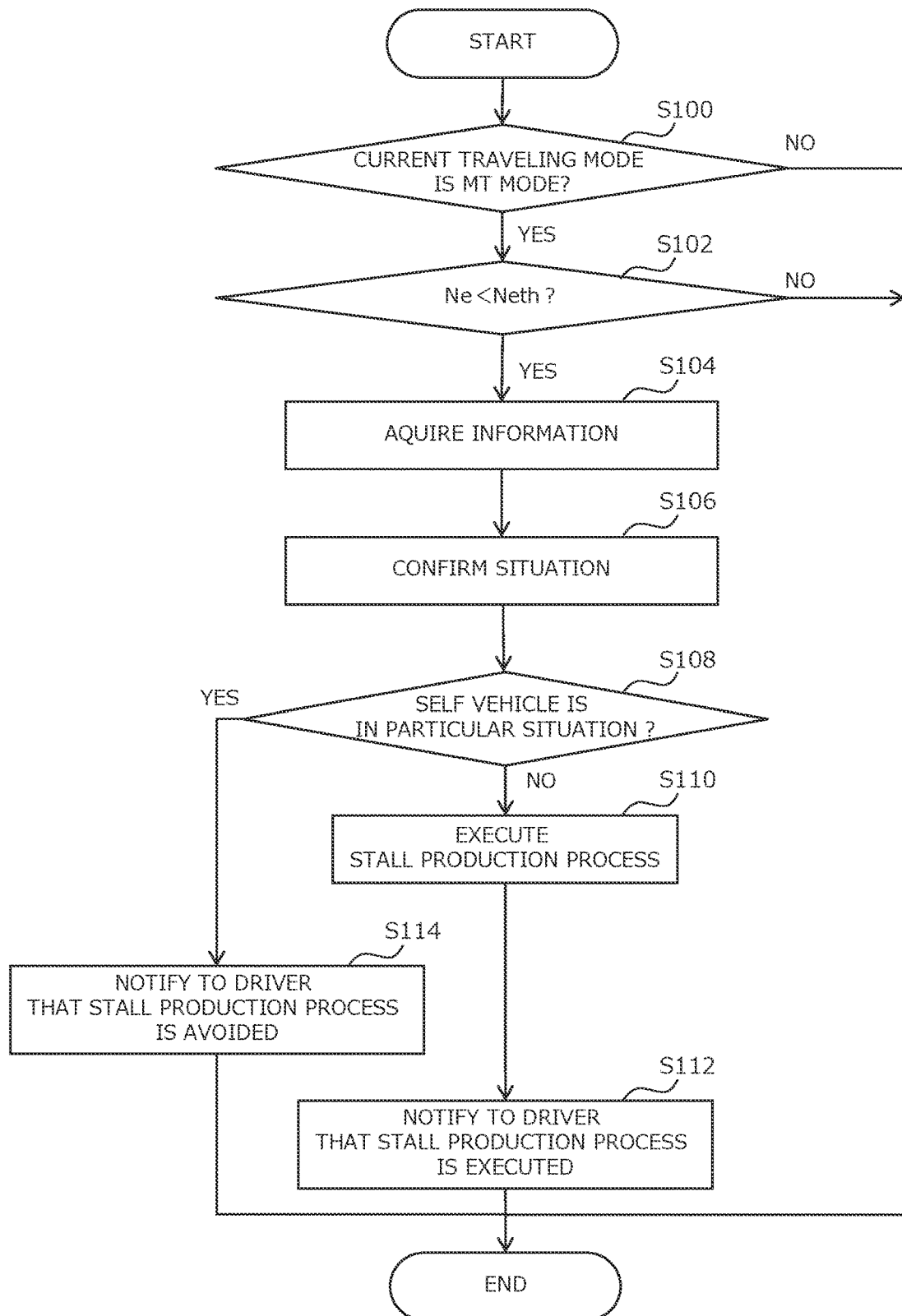
FIG. 11 is a flowchart showing the procedure of the stall production process including the stall determination process and the stall avoidance determination process.

FIG. 11 is a flowchart showing the procedure of the stall production process including the stall determination process and the stall avoidance determination process. In the step S100, it is determined whether the current traveling mode is the MT mode. When the current driving mode is the EV mode, the subsequent processing is skipped.

When the current running mode is the MT mode, it is determined in the step S102 whether the virtual engine speed Ne is lower than the predetermined stall limit engine speed Neth. The stall limit engine speed Neth assumes a lower limit of the engine speed that can be driven without engine stall in MT vehicles. Therefore, the stall limit engine speed Neth is set to an arbitrary value (for example, 600 rpm) as the stall limit engine speed at least in a range lower than the idle engine speed (for example, 1000 rpm). When the determination of Ne<Neth is satisfied, it is determined that the virtual engine of the vehicle is in a state of stalling. When the determination of Ne<Neth is not satisfied, it can be determined that the virtual engine of the vehicle are not stalled, so that the subsequent processes are skipped.

When the virtual engine is stalled, the process proceeds to step S104. In the step S104, information about the situation in which the vehicle is placed is acquired. The external sensors 60, 62, 64 are used to acquire the information.

Next, in step S106, the situation is confirmed based on the information acquired in the step S104. The situations to be confirmed are, for example, the road environment in which the vehicle is traveling, the current traveling scene, and the surrounding environment of the own vehicle. The items of the situation to be confirmed are determined in advance. For example, the items include a distance to a trailing vehicle, a degree of congestion of the road (congestion conditions), and an inclination angle of the traveling road. Each item is used to determine whether there is the specific situation in which the engine stall should be avoided. In the step S106, Each item is confirmed.

In the step S108, it is determined based on the result of the situation confirmation in step S106 whether the vehicle is in a particular situation in which the engine stall avoidance process is to be performed. Specifically, whether the distance to the trailing vehicle is smaller than a predetermined distance, whether the congestion degree of the road (congestion situation) is higher than a predetermined degree, or whether the inclination angle of the traveling road is greater than a predetermined inclination angle is determined. The threshold value for determining whether the specific situation is present is determined in consideration of whether it leads to unsafe operation of the driver or obstruction of traffic flow. When even one of the items is true, the determination is affirmative.

When the determination result of the step S108 is negative, it is determined that the stall production process may be performed, and the process proceeds to the step S110. In the step S110, the stall production process is executed. Here, the stall determination unit 500 outputs the stall instruction signal to the MT vehicle model 530. Upon receiving the stall instruction signal, the MT vehicle model 530 outputs the virtual engine output torque Teout calculated in the engine model 531 is changed to zero. When the virtual engine output torque Teout is zero, the motor torque calculated by the required motor torque calculation unit 540 becomes zero. This causes the electric vehicle 10 to stop as if the engine had stalled. When the processing of step S110 is completed, the processing proceeds to step S112.

In the step S112, the driver is notified that the stall production process is executed. The notification is displayed, for example, in the HMI unit installed in the vicinity of the instrument panel. Alternatively, the notification is output as voice from a speaker (not shown). Thus, the driver can recognize that the stop factor of the vehicle is caused by the engine stall production.

On the other hand, when the determination result of the step S108 is affirmative, it is determined that the stall production process is to be avoided, and the process proceeds to the step S114. In the step S114, the driver is notified that the stall production process is avoided. The notification is displayed, for example, in the HMI unit installed in the vicinity of the instrument panel. Alternatively, the notification is output as voice from a speaker (not shown). As a result, the driver can recognize that the vehicle is not likely to be stalled. When the process of step S114 is executed, the process of steps S110 and S112 are bypassed, and the routine is terminated. As a result, the driver can enjoy driving in the MT mode without anxiety and safely.

3. Other

The electric vehicle 10 according to the above embodiment is an FF vehicle for driving the front wheels with one electric motor 2. However, the present disclosure is also applicable to electric vehicles in which two electric motors are arranged in front and rear, and each of the front and rear wheels is driven. The present disclosure is also applicable to electric vehicles with in-wheel motors on each wheel. For the MT vehicle model in these cases, a model of an all-wheel-drive vehicle with MT can be used.

The electric vehicle 10 according to the above embodiment is not provided with a transmission. However, the present disclosure is also applicable to electric vehicles with stepped or continuously variable automatic transmissions. In this case, the power train consisting of the electric motor and the automatic transmission may be controlled so as to output the motor torque calculated by MT vehicle model.

What is claimed is:

1. An electric vehicle using an electric motor as a power source for traveling, the electric vehicle comprising:
   an accelerator pedal;
   a pseudo-clutch pedal;
   a pseudo-shifter; and
   a controller configured to control motor torque output by the electric motor,
   wherein, the controller comprises:
   a memory, and
   a processor, wherein the memory is configured to store an MT vehicle model simulating a torque characteristic of a driving wheel torque in an MT vehicle having an internal combustion engine which is controlled by operation of a gas pedal, and a manual transmission in which a gear stage is switched by operation of a clutch pedal and a shifter, wherein, the processor is configured to execute:

a process of receiving an operation amount of the accelerator pedal as an input of an operation amount of the gas pedal with respect to the MT vehicle model, a process of receiving an operation amount of the pseudo-clutch pedal as an input of an operation amount of the clutch pedal with respect to the MT vehicle model, a process of receiving a shift position of the pseudo-shifter as an input of a shift position of the shifter with respect to the MT vehicle model, a process of calculating a driving wheel torque determined by the operation amount of the accelerator pedal, the operation amount of the pseudo-clutch pedal, and the shift position of the pseudo-shifter, using the MT vehicle model, and a process of calculating a motor torque for providing the driving wheel torque to driving wheels of the electric vehicle, wherein, in the process of calculating the driving wheel torque, the processor is configured to execute:

a process of calculating an engine speed of the internal combustion engine using the MT vehicle model, a process of calculating an engine output torque of the internal combustion engine determined by the engine speed and the operation amount of the acceleration pedal, using the MT vehicle model, a process of calculating the driving wheel torque determined by the operation amount of the pseudo-clutch pedal, the shift position of the pseudo-shifter, and the engine output torque, using the MT vehicle model, and a stall production process of changing the engine output torque used in the calculation of the driving wheel torque to zero, when the engine speed of the internal combustion engine becomes lower than a predetermined stall engine speed, wherein the electric vehicle further comprises an external sensor for detecting a situation in which the electric vehicle is placed, and wherein the processor is configured to execute:

a process of determining whether the electric vehicle is in a specific situation in which the stall production process should be avoided based on the situation detected by the external sensor, and a process of avoiding execution of the stall production process when the engine speed of the internal combustion engine becomes lower than the predetermined stall engine speed and the electric vehicle is in the specific situation in the process of determining.

2. The electric vehicle according to claim 1, wherein, in the stall production process, the processor is configured to execute a process of notifying a driver of execution of the stall production process.

3. The electric vehicle according to claim 1, wherein the external sensor is configured to detect, as the situation, at least one of an inclination angle of a traveling road, a distance to a trailing vehicle, and a degree of congestion of a road.

4. The electric vehicle according to claim 1, wherein, the processor is configured to execute a process of notifying a driver that execution of the stall production process is avoided, when the electric vehicle is in the specific situation in the process of determining.

5. The electric vehicle according to The electric vehicle according to wherein the process of notifying includes displaying in a HMI unit installed in a vicinity of an instrument panel or outputting as voice from a speaker.

* * * * *